United States Patent [19]
Shindo

[11] Patent Number: 5,898,774
[45] Date of Patent: *Apr. 27, 1999

[54] PORTABLE TELEPHONE HAVING A REVERSIBLE AND SLIDING CARD CASING

[75] Inventor: Koji Shindo, Kanagawa, Japan

[73] Assignee: Sony Corporation, Tokyo, Japan

[*] Notice: This patent is subject to a terminal disclaimer.

[21] Appl. No.: 08/831,314

[22] Filed: Apr. 1, 1997

Related U.S. Application Data

[62] Division of application No. 08/655,437, May 30, 1996, Pat. No. 5,661,641.

[30] Foreign Application Priority Data

Jun. 5, 1995 [JP] Japan ................................ P07-138187

[51] Int. Cl.⁶ ...................................................... H04M 1/00
[52] U.S. Cl. ............................................ 379/433; 379/434
[58] Field of Search ..................................... 379/433, 428, 379/440, 110.01; 455/575, 90, 351, 347, 348; 361/814, 752, 756, 755, 679, 680, 681; 174/356 C, 50.51, 35 TS, 35 R; D14/181, 257, 191

[56] References Cited

U.S. PATENT DOCUMENTS 5,369,788  11/1994  Nagai .......................................... 455/90
5,494,447   2/1996  Zaidan ....................................... 361/681

Primary Examiner—Jack Chiang
Attorney, Agent, or Firm—Jay H. Maioli

[57] ABSTRACT

A portable information terminal includes a body casing which incorporates a function unit for transmitting and receiving information and has a groove portion with a plane bottom, and a card casing which is reversibly and slidably attached in the plane-bottom groove portion of the body casing and has an operation unit. The plane-bottom groove portion of the body casing has a rectangular shape with side surfaces opposed to each other and a pair of guide grooves are formed on the opposed surfaces thereof. The card casing has a rectangular shape substantially similar to that of the plane-bottom groove portion and has a pair of pins near the end portions of the opposed side surfaces. The card casing is attached to the body casing by inserting the pair of pins into the pair of guide grooves. The body casing includes a first light emitter and a first light detector and the card casing comprises a second light emitter and a second light detector which are respectively disposed so as to be opposed to the first light emitter and the first light detector when the portable information terminal is used. The body casing includes a second operation unit on a plane portion of the plane-bottom groove portion.

1 Claim, 9 Drawing Sheets

PORTABLE TELEPHONE HAVING A REVERSIBLE AND SLIDING CARD CASING

This is a division of application Ser. No. 08/655,437 filed May 30, 1996, U.S. Pat. No. 5,661,641.

BACKGROUND OF THE INVENTION

1. Field of the Invention

The present invention relates to a portable information terminal suitable for use in a handset of a radio telephone apparatus and so on.

2. Description of the Related Art

Various proposed casings of the portable information terminal such as a radio telephone apparatus, a portable telephone apparatus or the like are arranged so as to be convenient in portability.

FIG. 1 is a perspective view showing a portable telephone apparatus which is not being used for communication. FIG. 2 is a perspective view showing the portable telephone apparatus which is being used for communication.

In FIGS. 1 and 2, a portable telephone set 1 is formed of a body casing 2 and a card casing (sub casing) 3.

The body casing 2 has a shape of a substantially rectangular parallelepiped. As shown in FIG. 2, the body casing 2 has a step portion 4 and a thickness of a lower-side portion 2b of the body casing 2 is less than that of an upper-side portion 2a thereof. A panel 5 having an operation key group 6 for a telephone such as a ten key or the like is provided on a front surface of the lower-side portion 2b. A hook switch 7 is provided on the panel 5.

The upper-side portion 2a of the body casing 2 incorporates a receiver 8 therein. The receiver 8 emanates a dial tone through apertures 9 provided through the body casing 2. A power source key 10 is provided on a front surface of the upper-side portion 2a. An antenna 11 can be inserted in the body casing 2 and is drawn therefrom upon a telephone call as shown in FIG. 2.

The card casing 3 incorporating a transmitter 13 is pivotally fitted to a lower end edge portion of the body casing 2 by a hinge portion 12. The back surface of the card casing 3 merely functions as a cover in a state that the card casing 3 is rotated around the hinge portion 12 and closed so as to be opposed to the panel 5 of the body casing 2 as shown in FIG. 1. On the other hand, in a state that the card casing 3 is rotated around the hinge portion 12 and opened as shown in FIG. 2, a user can make a telephone call by speaking toward the transmitter 13 through apertures 14 formed through a transmitter-side surface of the card casing 3.

According to the portable telephone apparatus having the above arrangement, it is possible to make the portable telephone apparatus compact when the user carries it, and it is possible to realize an arrangement which provides convenience in portability. However, since the portable telephone apparatus is used upon a telephone call with the card casing 3 being rotated around the hinge portion 12 and opened as shown in FIG. 2, the card casing 3 is not stable, is easily broken, and may come off from the body casing 2, which leads to inconvenience in use thereof.

Moreover, there is then the problem that when the user makes a telephone call, the body casing 2 and the opened card casing 3 occupy a considerable space or area and hence the whole of the portable telephone apparatus becomes large-sized.

SUMMARY OF THE INVENTION

In view of such aspects, it is an object of the present invention to provide a portable information terminal which solves the above problems and more particularly a portable information terminal which provides a satisfactory operability with only operation keys required for a telephone call or communication being provided on a card casing in a used state for a telephone call or communication, and which has a compact size and prevents the card casing from being unstable during the telephone call or communication.

According to the present invention, a portable information terminal includes a body casing which incorporates a function unit for transmitting and receiving information and has a groove portion with a plane bottom, and a card casing which is reversibly and slidably attached in the plane-bottom groove portion of the body casing and has an operation unit. The plane-bottom groove portion of the body casing has a rectangular shape with side surfaces opposed to each other and a pair of guide grooves are formed on the opposed surfaces thereof. The card casing has a rectangular shape substantially similar to that of the plane-bottom groove portion and has a pair of pins near the end portions of the opposed side surfaces. The card casing is attached to the body casing by inserting the pair of pins into the pair of guide grooves. The body casing includes a first light emitter and a first light detector and the card casing comprises a second light emitter and a second light detector which are respectively disposed so as to be opposed to the first light emitter and the first light detector when the portable information terminal is used. The body casing includes a second operation unit on a plane portion of the plane-bottom groove portion. One surface of the card casing is formed as a protective surface and the operation unit is formed on the other surface of the card casing. The operation unit of the card casing includes a key input unit or a touch-sensitive panel input unit.

DESCRIPTION OF THE PREFERRED EMBODIMENTS

Figure 1:
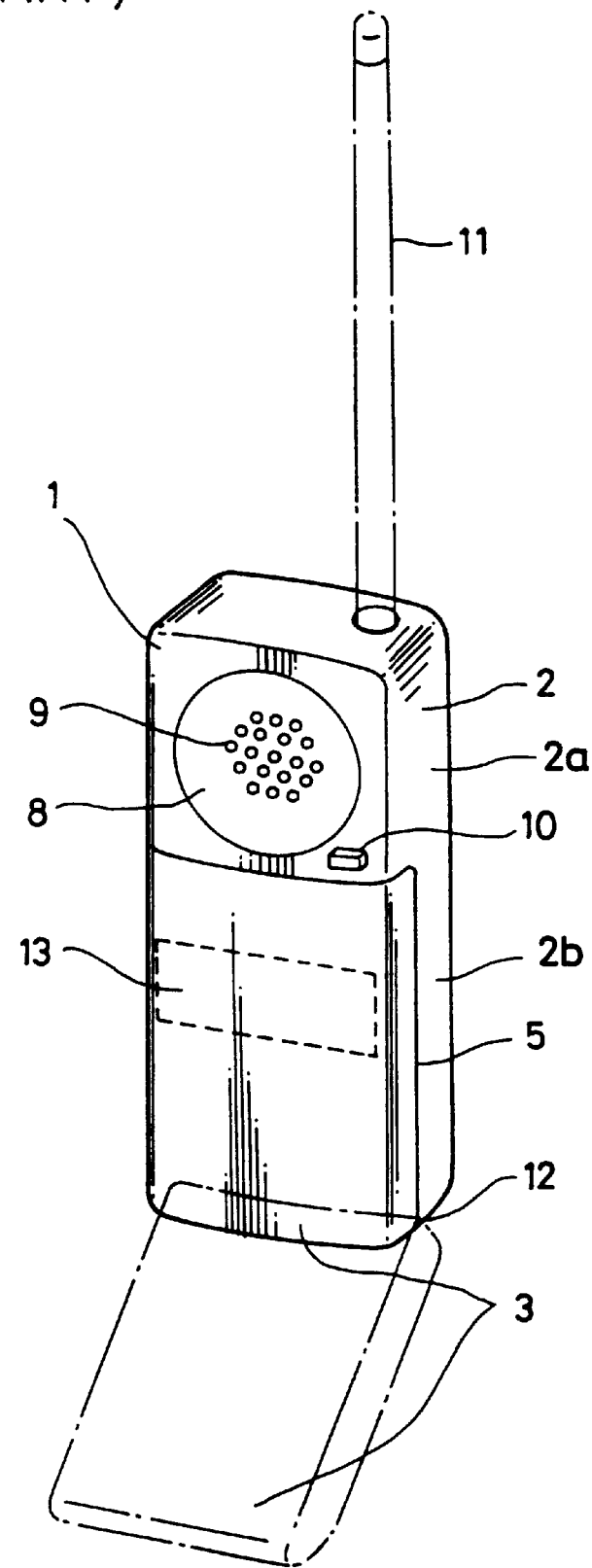
FIG. 1 is a perspective view showing a portable telephone apparatus which is not being used for communication.

A portable telephone set or a portable radio transceiver to which a portable information terminal according to the embodiments of the present invention is applied will be described in detail with reference to FIGS. 3 to 13.

Before an arrangement of the casing of the portable radio telephone apparatus according to the first embodiment is described, one example of an electrical circuit arrangement thereof will be described by way of example with reference to FIG. 3. In FIG. 3, parts and elements corresponding to those in FIGS. 1 and 2 are marked with the same reference numerals.

Figure 2:
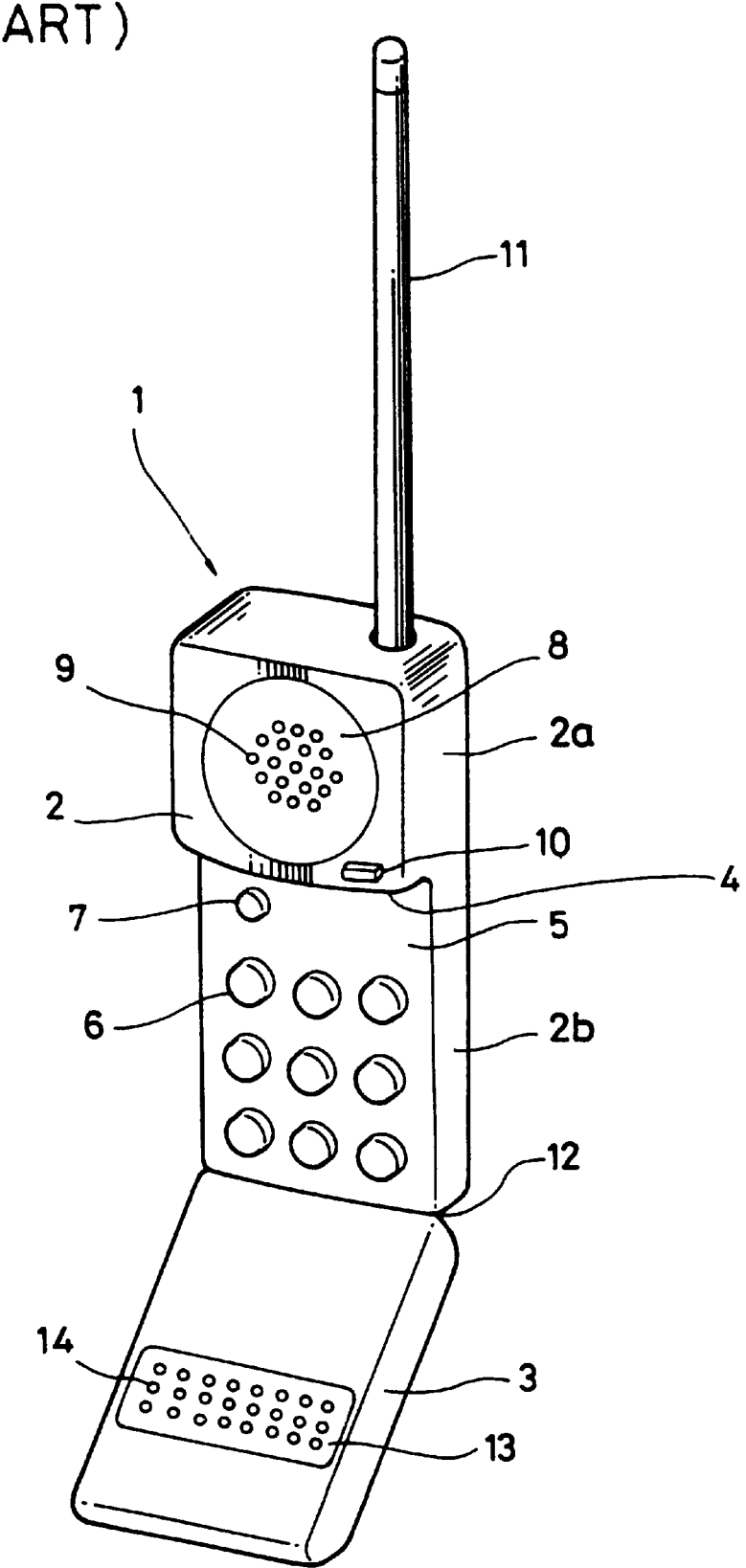
FIG. 2 is a perspective view showing the portable telephone apparatus shown in FIG. 1 which is being used for communication.
Figure 3:
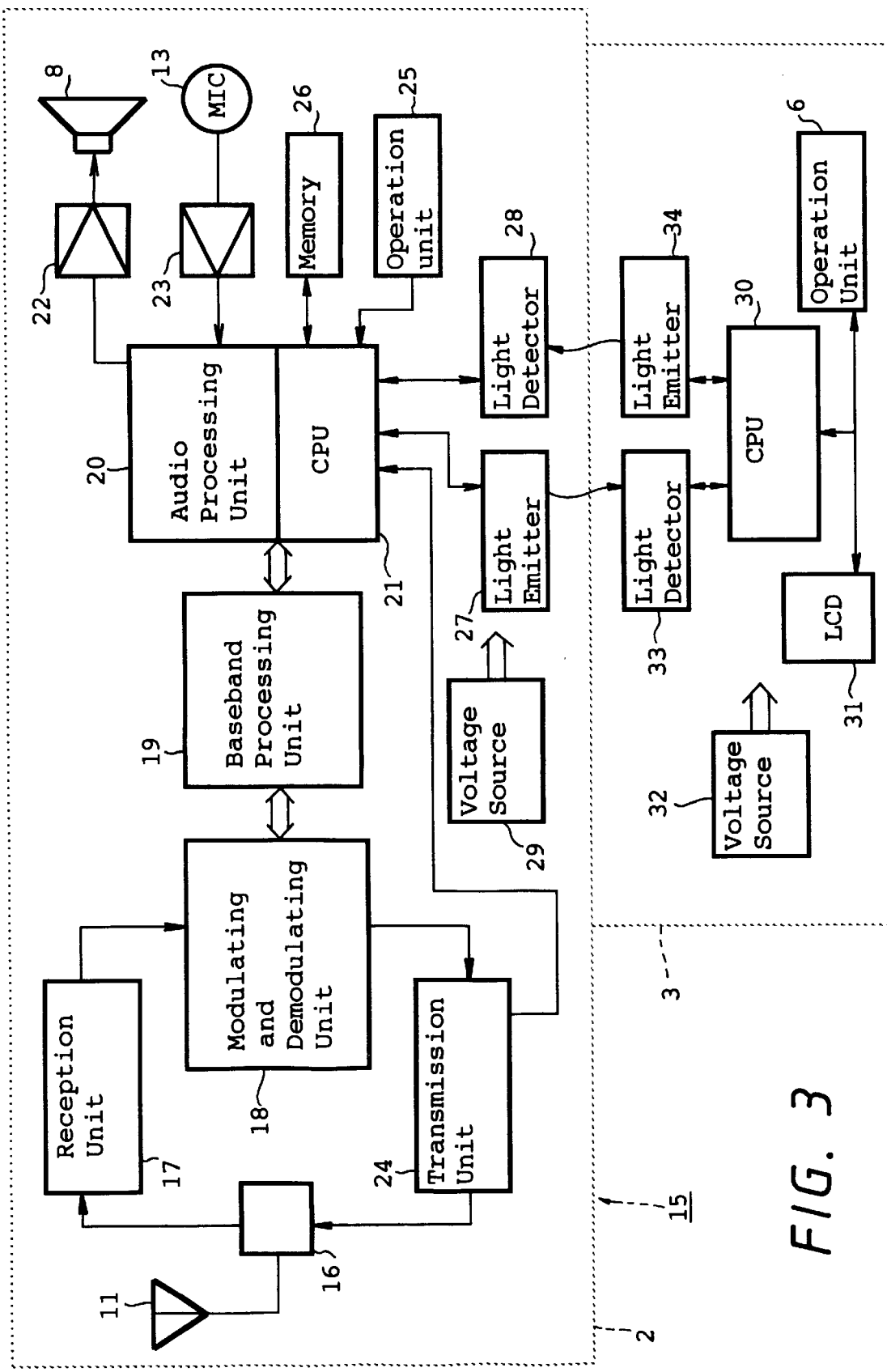
FIG. 3 is a systematic diagram showing an arrangement of a portable information terminal according to the present invention; FIG.

As shown in FIG. 3, a portable radio telephone apparatus 15 as the portable information terminal is formed of a body casing 2 and a card casing 3 similarly to the portable telephone set 1 shown in FIGS. 1 and 2. The arrangement of both of the casings 2, 3 will be described later on.

In the body casing 2, a signal received by an antenna 11 is supplied through an antenna coupler 16 to a reception unit 17. The reception unit 17 subjects the received signal to reception processing for converting the received signal to a signal of a predetermined transmission channel and supplies the processed received signal to a modulating and demodulating unit 18. The modulating and demodulating unit 18 demodulates the received signal to convert the signal to a baseband signal and supplies the demodulated baseband signal to a baseband processing unit 19.

The baseband processing unit 19 extracts an audio signal and a control data from the received signal and supplies the extracted audio signal to an audio processing unit 20 and the control data to a control unit (hereinafter referred to as a CPU) 21.

The audio processing unit 20 processes the audio signal extracted from the received signal and supplies the processed audio signal through an amplifier 22 to a receiver 8. The receiver 8 emanates a sound in accordance with the audio signal.

The CPU 21 carries out a communication control such as control for setting and switching a communication channel or the like based on the control data supplied from the baseband processing unit 19.

An audio signal output from a transmitter (microphone) 13 is supplied through an amplifier 23 to the audio processing unit 20. The audio processing unit 20 subjects the audio signal to audio processing for transmission and then supplies the processed audio signal to the baseband processing unit 19. The baseband processing unit 19 subjects the audio signal to the baseband processing to obtain a transmission audio signal, and supplies the transmission audio signal to the modulating and demodulating unit 18. The modulating and demodulating unit 18 carries out modulation processing for transmission. The modulating and demodulating unit 18 supplies the modulated signal to a transmission unit 24. The transmission unit 24 converts the modulated signal into a transmission signal of a predetermined transmission channel, and supplies the transmission signal through the antenna coupler 16 to the antenna 11. The transmission signal is transmitted from the antenna 11 by wireless.

The CPU 21 is connected with an operation unit 25. When a user operates keys forming the operation unit 25, the CPU 21 controls various operations of the portable telephone apparatus based on the user's operation. For example, the operation unit 25 is provided with an operation key group for registration of abbreviated dialing, the setting and so on. The CPU 21 includes a memory 26 formed of a ROM, a RAM and so on for storing communication log data and so on. Moreover, to transmit and receive information signals between the body casing 2 side and the card casing 3 side by wireless (optical communication), a light emitter 27 and a light detector 28 are provided in the body casing 2 and a voltage source 29 such as a primary or secondary battery is incorporated in the body casing 2.

In the card casing 3, a control unit (hereinafter referred to as a CPU) 30 such as a microcomputer or the like is provided. The CPU 30 is connected to an operation unit 6. The operation unit 6 is formed of a ten key pad, for example, or the like and used when a telephone number is input for a telephone call and processing for dialing the input telephone number is carried out. A large-size display unit 31 formed of a liquid crystal display (LCD) or the like may be attached to the card casing 3 if necessary.

The CPU 30 is further connected with a light detector 33 for receiving an optical information signal from the light emitter 27 on the body casing 2 side and a light emitter 34 for transmitting an optical information signal to the light detector 28 on the body casing 2 side, thereby allowing for optical communication (or a wireless communication) to be carried out between the CPUs 21 and 30. A voltage source 32 such as a primary or secondary battery can be housed in the card casing 3.

The radio telephone apparatus as the portable information terminal according to the first embodiment will be described with reference to FIGS. 4 to 8. FIGS. 4 to 8 are perspective views showing how to operate the card casing according to this embodiment.

In FIGS. 4 to 8, the body casing 2 of the portable information terminal 15 is made of synthetic resin or the like and has the shape of a substantially flat, rectangular box. Upper and lower end portions of the portable information terminal 15 are respectively formed as semicircular portions 50U and 50L. The receiver 8 and the transmitter 13 are respectively provided in the upper and lower semicircular portions 50U and 50L. Respective apertures 9 and 14 formed through arch-shaped plane portions of the upper and lower semicircular portions 50U and 50L are apertures used when the receiver 8 emanates sounds and the transmitter 13 picks up sounds.

Figure 5:
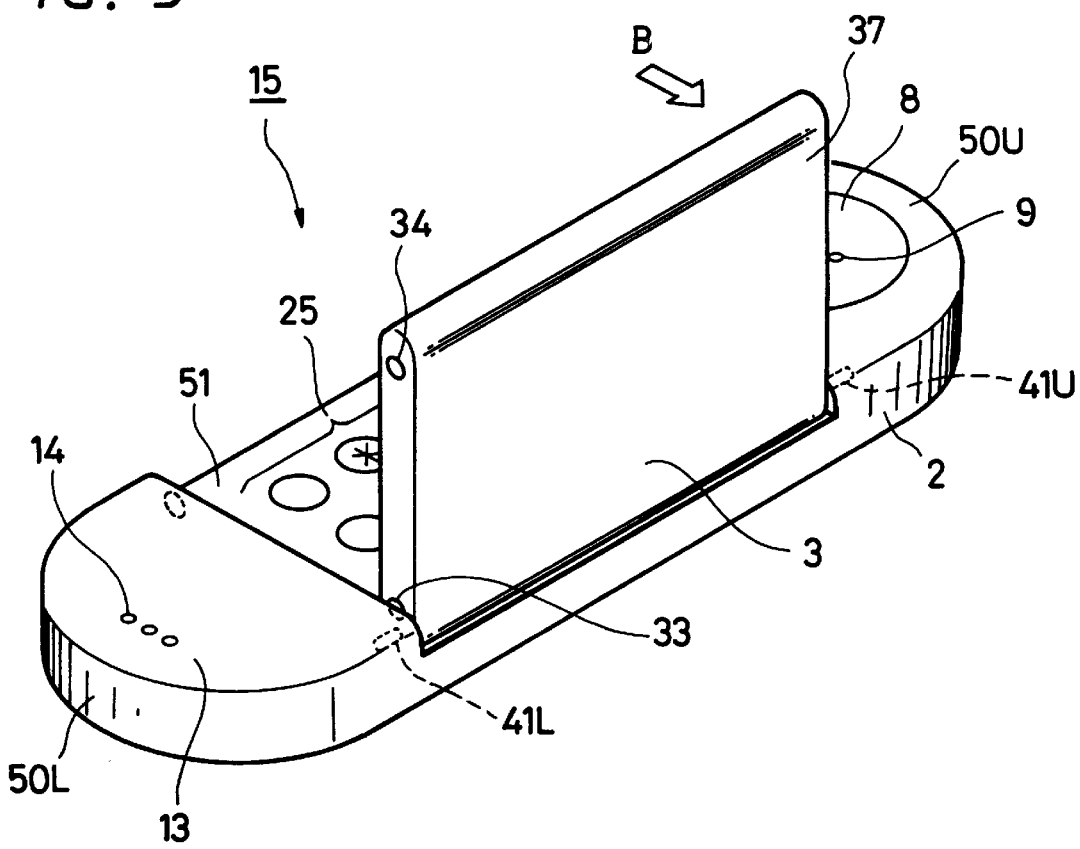
FIG. 5 is a perspective view of the portable telephone apparatus with its card casing being erected according to the first embodiment.
Figure 6:
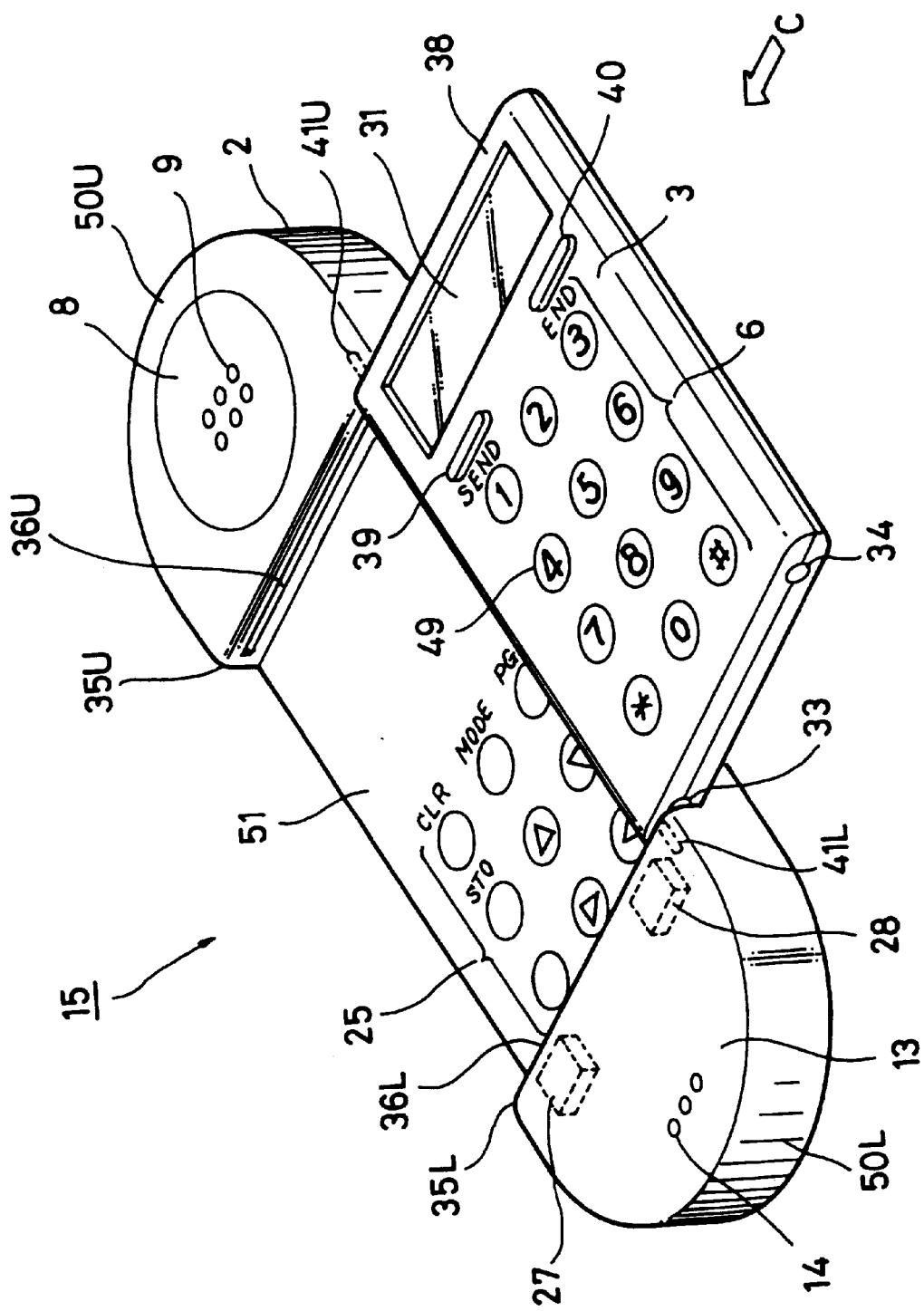
FIG. 6 is a perspective view of the portable telephone apparatus with its card casing being inverted according to the first embodiment.
Figure 7:
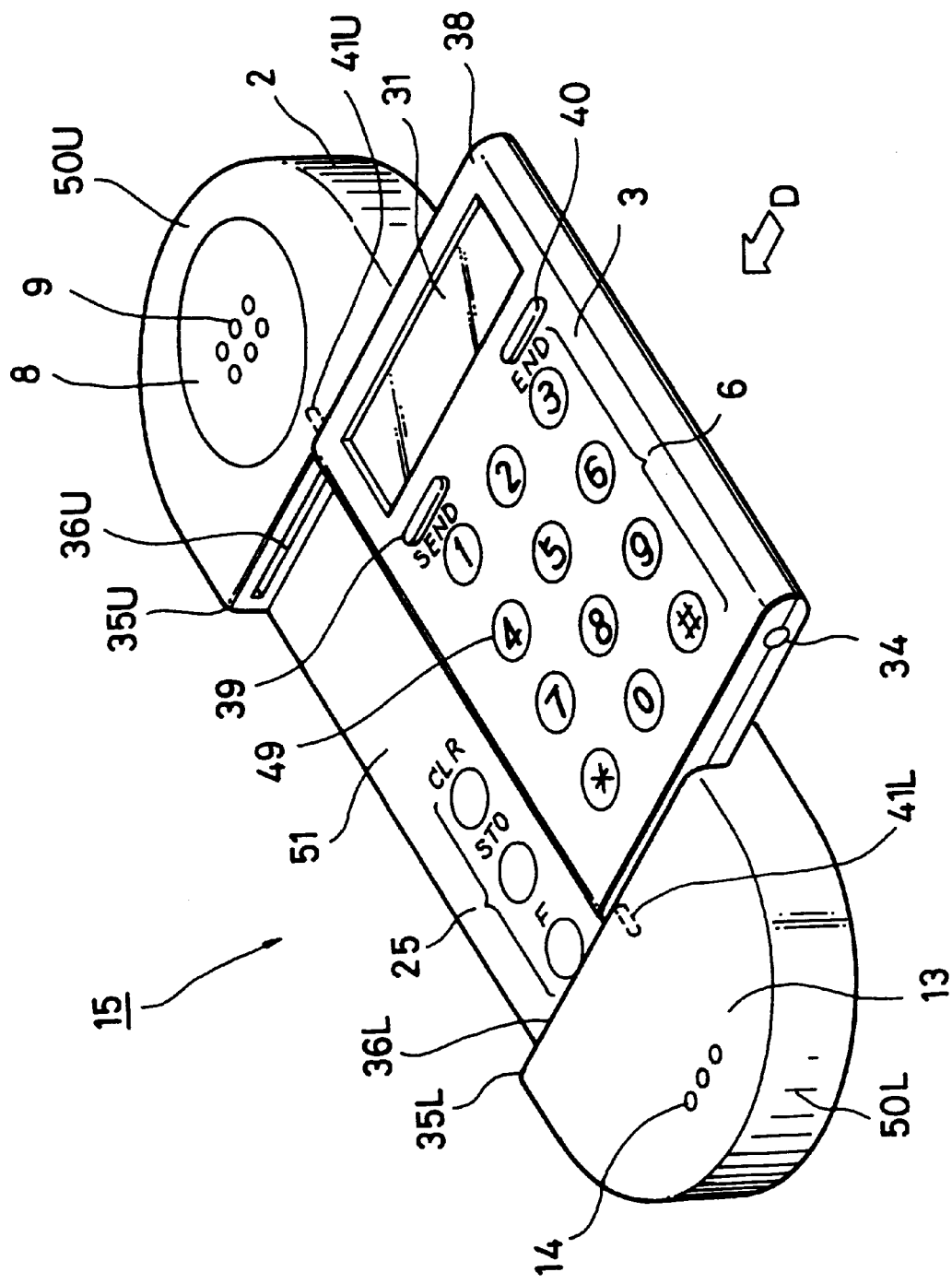
FIG. 7 is a perspective view of the portable telephone apparatus with its card casing being slid according to the first embodiment.

As shown in FIGS. 5 to 7, the body casing 2 has a groove portion formed at a portion other than the upper and lower semicircular portions 50U and 50L thereof, the groove portion having a rectangular bottom plane which is lower than the upper and lower semicircular portions 50U and 50L. The grove portion is formed as a panel 51 where the operation key group such as a registration key or the like forming the first operation unit 25 is provided.

Guide grooves 36U and 36L, which will be described later on, for guiding slide pins 41U and 41L of the card casing 3 are formed in the left and right direction (in the direction of a short side of the panel 51) at the middle of step portions 35U and 35L as shown in FIGS. 5 to 7 which form boundaries between the panel 51 and the upper and lower semicircular portions 50U and 50L. The light emitter 27 and the light detector 28 are buried in the lower semicircular portion 50L at the places opposed to the step portion 35L. The guide grooves 36U and 36L have pivot portions at their respective ends, respectively.

An arrangement of the card casing 3 will be described. The card casing 3 is made of a synthetic resin or the like and has the shape of a substantially rectangular and flat box. The slide pins 41U and 41L are projectingly plated as pivots at the positions near the end portions of the upper and lower surfaces of the card casing 3 respectively opposed to the upper and lower step portions 35U and 35L. The slide pins 41U and 41L are respectively inserted into the guide grooves 36U and 36L formed in the step portions 35U and 35L. The slide pins 41U and 41L can be slid into the guide grooves 36U and 36L and can be rotated around the pivot portions at the end portions of the guide grooves 36U and 36L, respectively.

The card casing 3 includes the CPU 30, the operation unit 6, the display unit (hereinafter referred to as a LCD) 31, the light detector 33 and the light emitter 34 which are described with reference to FIG. 3.

Figure 4:
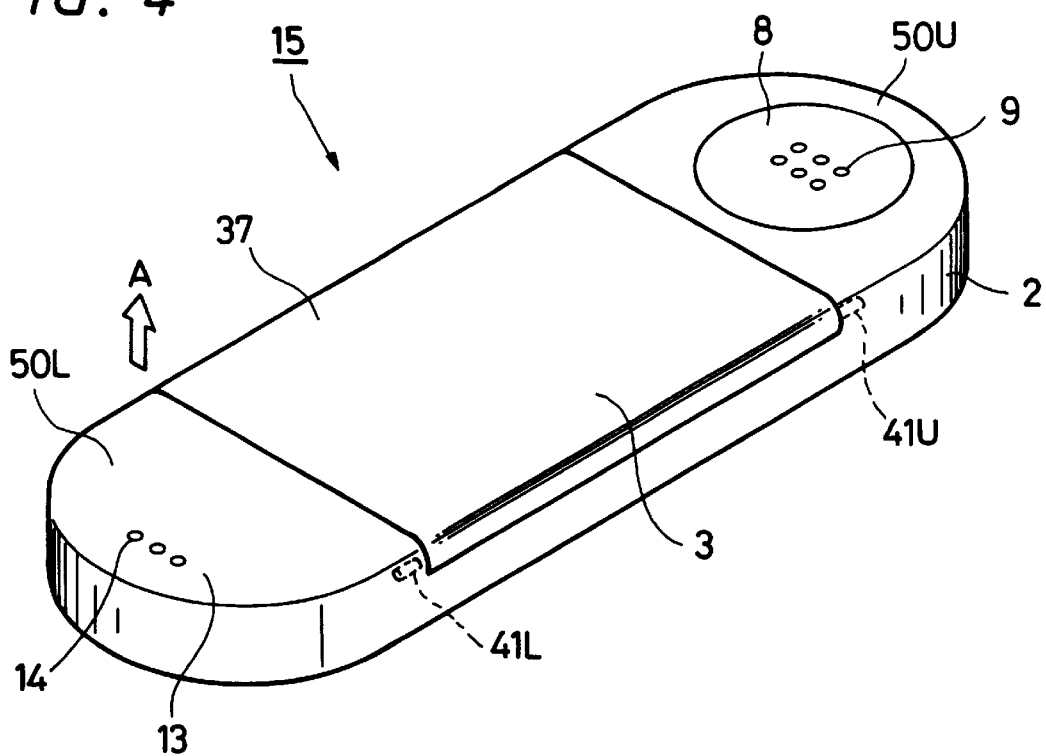
FIG. 4 is a perspective view showing a portable telephone apparatus according to a first embodiment of the present invention which is not being used for communication.

The front surface of the card casing 3 is used as a cover portion 37 as shown in FIG. 4. The cover portion 37 functions to protect the key group in the operation unit 25 formed on the panel 51 of the body casing 2, the LCD 31 provided on a rear side of the card casing 3, and so on which will be described later in detail. Since the cover portion 37 prevents the key group from being exposed even when the user does not use the portable information terminal 15, i.e., carries it in a bag, a pocket or the like, it is possible to prevent the portable information terminal 15 from being operated by mistake.

The operation unit 6 formed of the LCD 31 and an operation key group such as a ten key pad 49, a send key 39, an end key 40 or the like is provided on a rear side panel 38 of the card casing 3.

The light detector 33 is provided at one end portion of the lower side surface of the card casing 3 opposed to the light emitter 27 incorporated in the lower semicircular portion 50L of the body casing 2 as described with reference to FIG. 6. The light emitter 34 is provided at the other end portion of the lower side surface of the card casing 3 opposed to the light detector 28 provided on the body casing 2 side. The antenna 11 is incorporated in the body casing 2.

An operation of the card casing 3 of the portable information terminal 15 according to the first embodiment having the above arrangement will be described with reference to FIGS. 4 to 8.

FIG. 4 is a perspective view of the portable radio telephone apparatus 15 according to this embodiment which is not being used (not being used for making a telephone call). As shown in FIG. 4, the panel 51 of the body casing 2 is covered with the cover portion 37 of the card casing 3. The portable radio telephone apparatus 15 in this state is convenient in portability.

In this state, when the left side surface of the cover portion 37 shown in FIG. 4 is pulled in the direction shown by an arrow A, the card casing 3 is rotated around the slide pins 41U and 41L provided at the right-side-surface side thereof as shown in FIG. 5, thereby the card casing 3 being erected.

In this state, when the card casing 3 shown in FIG. 5 is pushed from the rear side (the panel 38 side) in the direction shown by an arrow B, the card casing 3 is further rotated relative to the body casing 2 around the slide pins 41U and 41L, thereby the panel 38 provided on the rear side of the card casing 3 being faced forward as shown in FIG. 6. In this state, the panel 51 of the body casing 2 is entirely exposed, which allows the user to carry out various operations such as the setting of an abbreviated dialing code of a telephone number or the like by using the various keys of the operation unit 25. In this case, the registration data and so on can be displayed on the LCD 31.

When the card casing 3 inverted as shown in FIG. 6 is pushed in the direction shown by an arrow C, the slide pins 41U and 41L of the card casing 3 are slid along the upper and lower guide grooves 36U and 36L of the upper and lower step portions 35U and 35L of the body casing 2 and then the card casing 3 is covering and closing the panel 51 as shown in FIG. 7.

Figure 8:
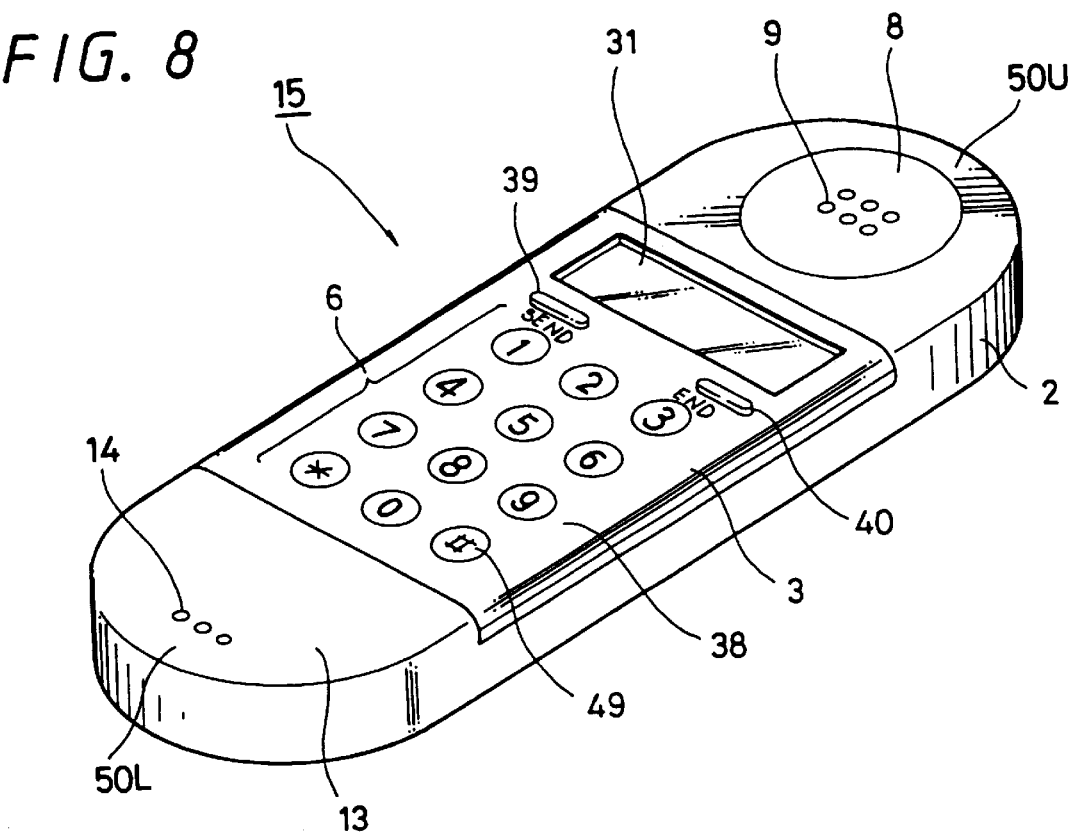
FIG. 8 is a perspective view showing the portable telephone apparatus which is being used for communication according to the first embodiment.

In the state shown in FIG. 7, when the card casing 3 is further pushed in the direction shown by the arrow D, the upper and lower slide pins 41U and 41L are stopped at the left end portions of the upper and lower guide grooves 36U and 36L formed in the upper and lower step portions 35U and 35L of the body casing 2, whereby the card casing 3 is held in the state that the portable radio telephone apparatus 15 can be used for making a telephone call as shown in FIG. 8.

According to such portable information terminal 15 of the first embodiment, since the portable information terminal 15 does not occupy a considerable amount of space as required when the card casing (sub casing) 3 of the portable telephone set 1 shown in FIG. 2 is hung from a hinge portion of a body casing 2 thereof, the space occupied by both of the body casing 2 and the card casing 3 of the portable information terminal 15 according to the first embodiment is prevented from being increased unnecessarily. In addition, the portable information terminal 15 according to this embodiment is free from breakage and detachment of the card casing at the hinge portion during a telephone call. Moreover, since the portable information terminal 15 in the state shown in FIG. 6 is used for registration of telephone numbers for abbreviated dialing or the like and the portable information terminal 15 shown in FIG. 8 is used for making or receiving a telephone call, the operation for the registration or the like and the operation for making a telephone call are carried out by using the respective panels, which leads to simple operation without use of keys serving for both of the operations.

Figure 9:
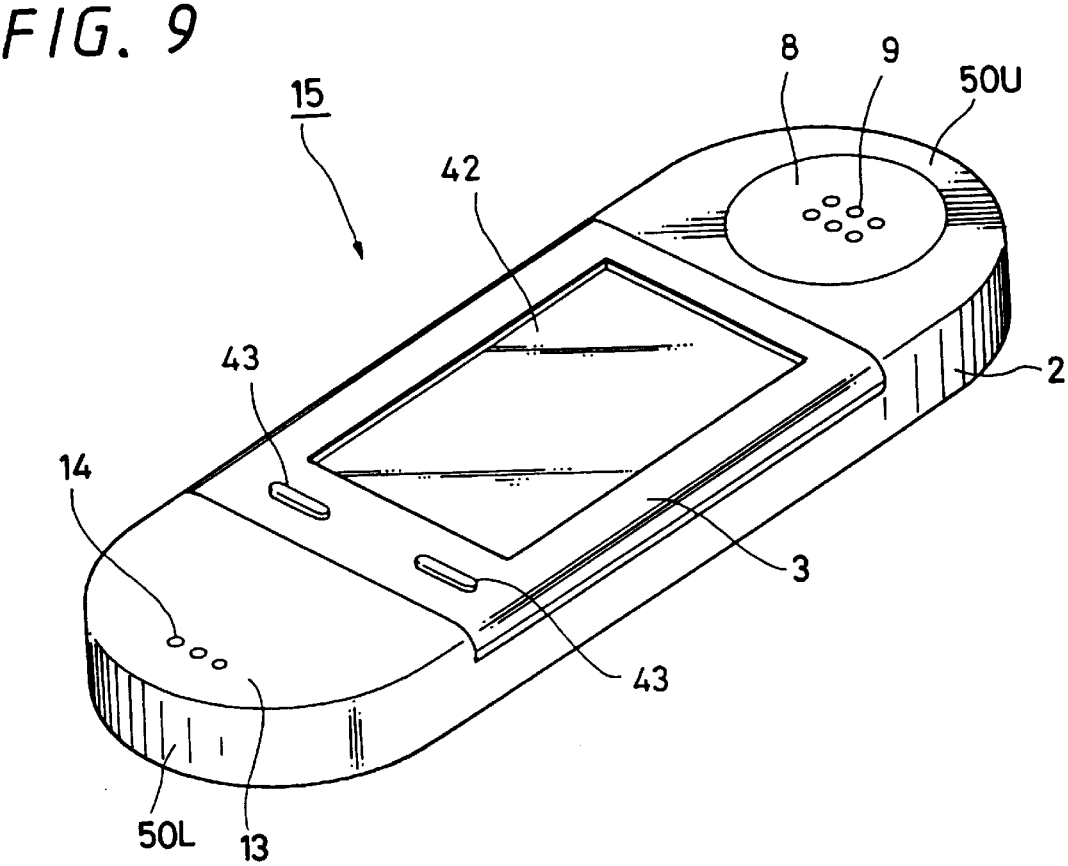
FIG. 9 is a perspective view showing a portable telephone apparatus according to a second embodiment of the present invention which is not being used for communication.
Figure 10:
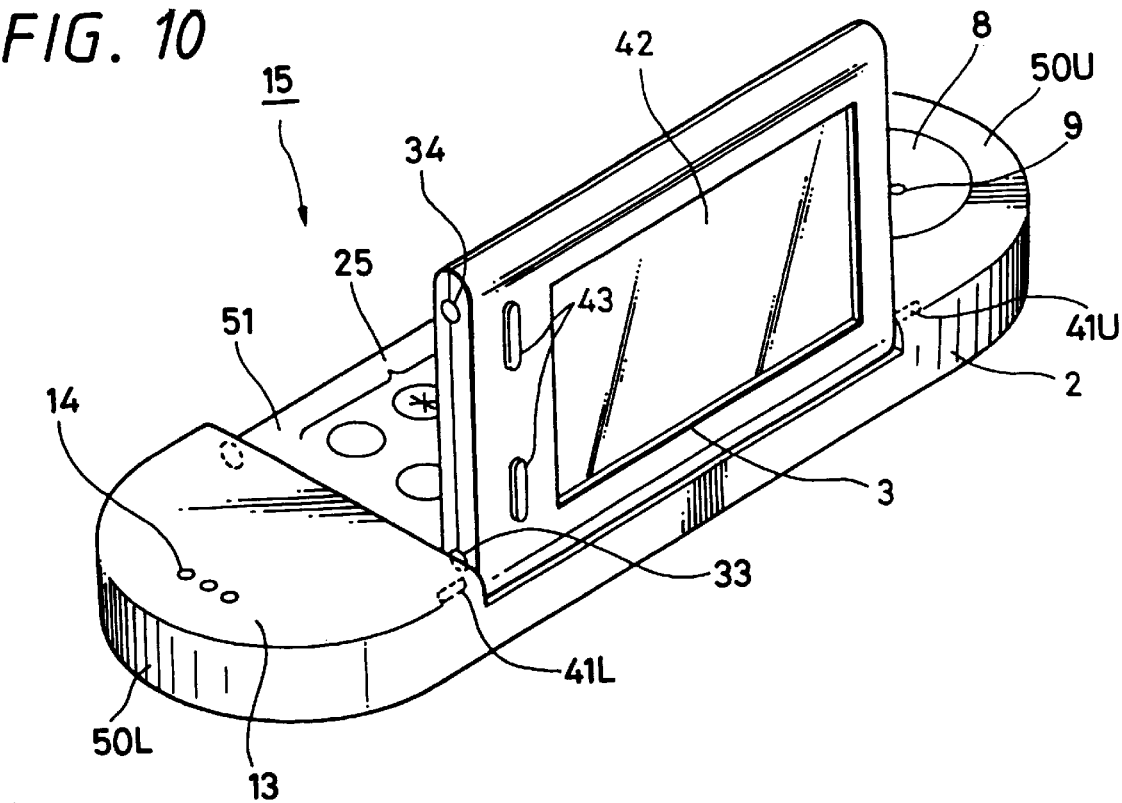
FIG. 10 is a perspective view of the portable telephone apparatus according to the second embodiment of the present invention with its card casing being erected.

FIGS. 9 and 10 show the portable information terminal 15 according to the second embodiment of the present invention. In the second embodiment, a display unit 42 formed of a large-size LCD or the like is provided on the side of the cover portion 37 of the card casing 3 according to the first embodiment shown in FIG. 4. The LCD 31 provided on the panel 38 side of the card casing 3 in the first embodiment is used to display the telephone number, a calling time and so on upon a telephone call. The large-size LCD 42 of the second embodiment is used for the display carried out when text data, data of a handwritten manuscript, picture data and so on of an electronic mail are transmitted or received. Keys 43 provided on the card casing 3 are scroll keys used for scrolling when a message having a large number of letters is displayed on the LCD 42. In order to use both the LCD 42 and the panel 38 respectively provided on the front and rear sides of the card casing 3, a pair of a light emitter and a light detector are provided at each of the two positions at which the light emitter 27 and the light detector 28 are respectively provided in the first embodiment.

The card casing 3 having such large-size LCD 42 and the scroll keys 43 is erected as shown in FIG. 10 and then inverted and slid similarly to the operations of the first embodiment described with reference to FIGS. 6 to 8, thereby being set in the state shown in FIG. 8. Thus, it is possible to transmit and receive the audio data upon a telephone call.

Figure 11:
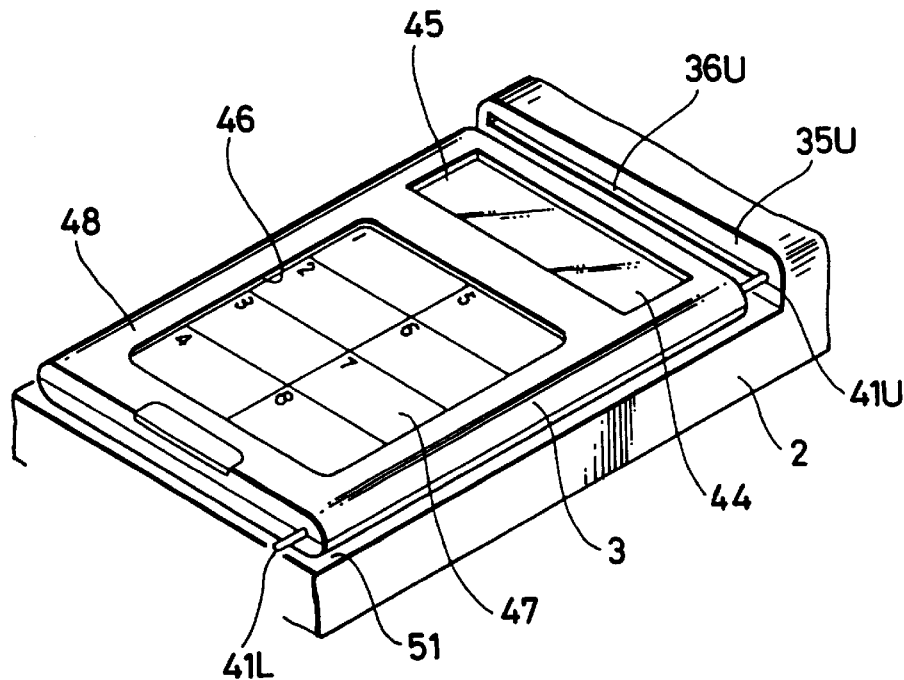
FIG. 11 is a perspective view used to explain how to attach and detach the card casing of the portable information terminal according to a third embodiment.
Figure 12:
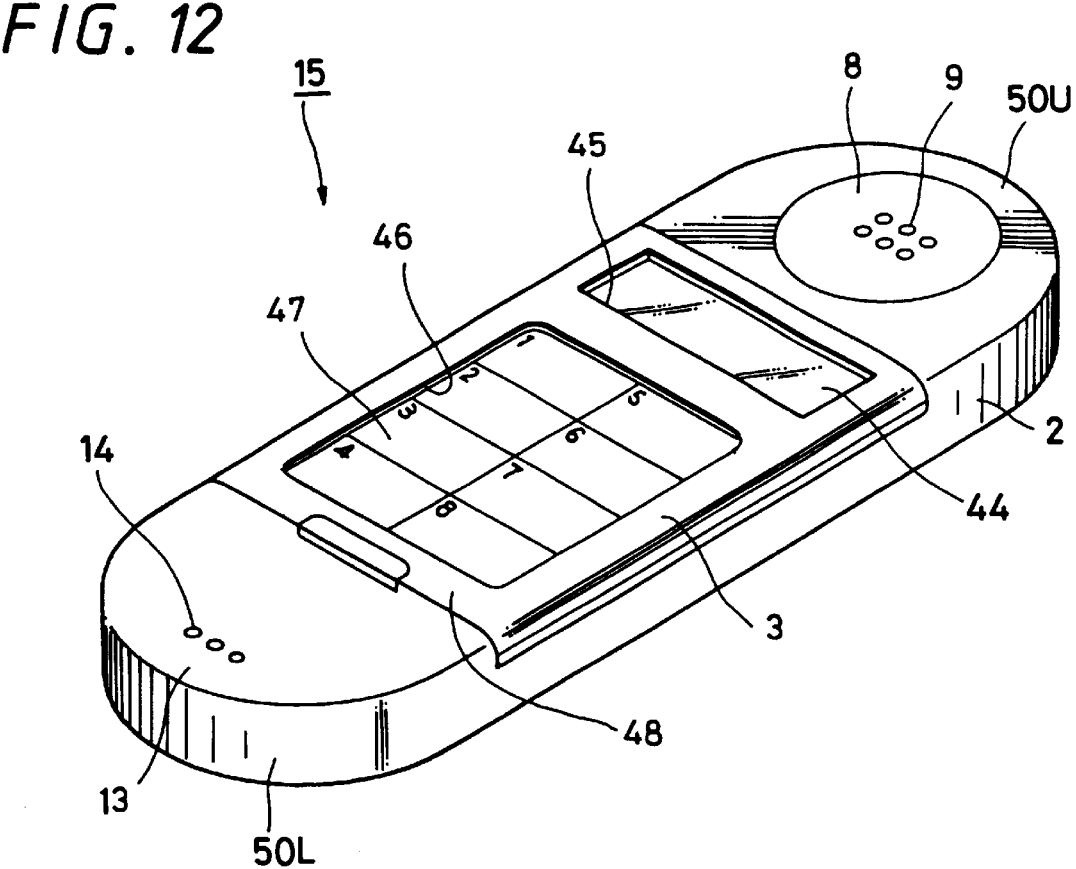
FIG. 12 is a perspective view showing the portable telephone apparatus according to the third embodiment of the present invention which is not being used for communication.
Figure 13:
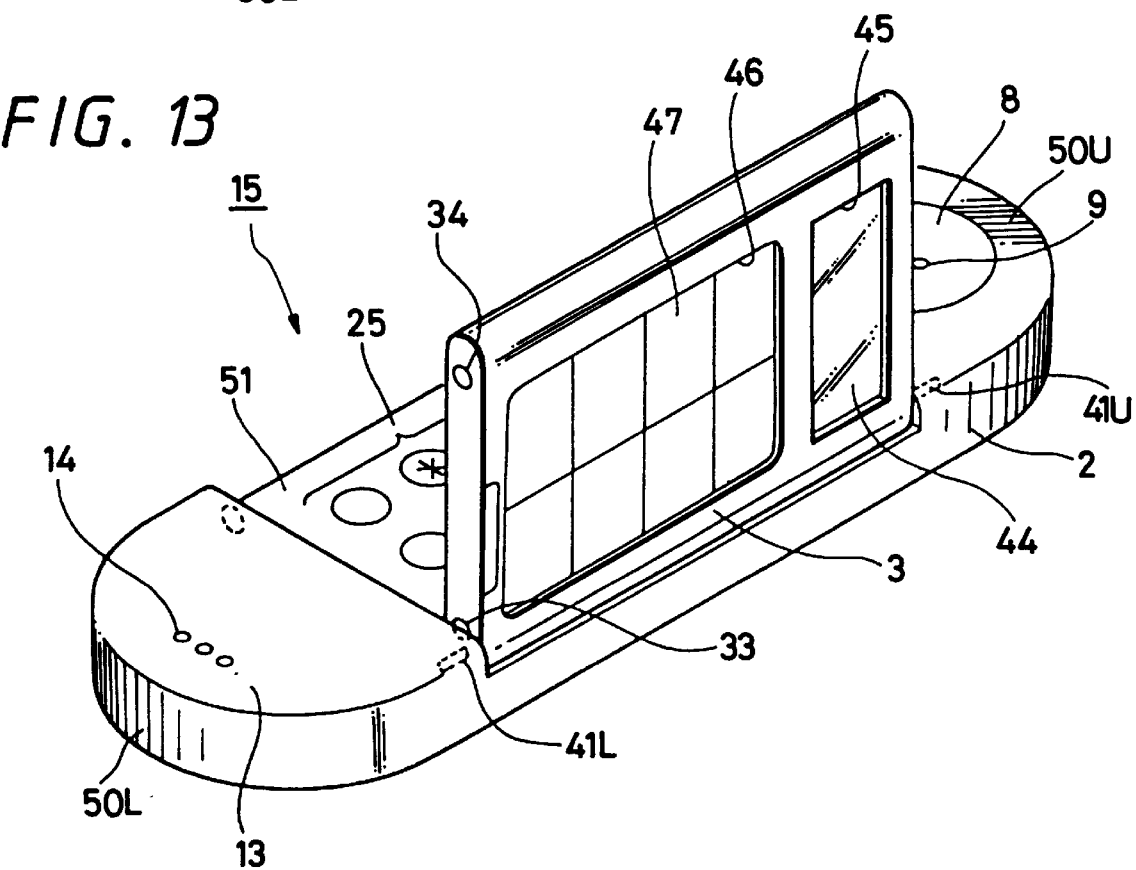
FIG. 13 is a perspective view of the portable telephone apparatus with its card casing being erected according to the third embodiment.

FIGS. 11 to 13 show a portable information terminal 15 according to the third embodiment of the present invention. FIG. 11 is a perspective view of the portable information terminal 15 used to explain how to attach and detach the card casing 3 having a touch-sensitive panel 44 provided thereon to and from the concave panel 51 formed with the upper and lower step portions 35U and 35L of the body casing 2 when the card casing 3 can be detachably attached to the panel 51.

As shown in FIG. 11, the card casing 3 according to the third embodiment has a touch-sensitive panel 44 instead of the large-size LCD 42 of the second embodiment shown in FIG. 9. The card casing 3 of the third embodiment has a display unit 45 on the touch-sensitive panel 44. The card casing has a frame body 48 having an aperture portion 46, into which a one-touch dialing card 47 can be inserted, on the lower side of a front surface thereof, and has the operation unit 6 formed of a ten key pad or the like similarly to the card casing 3 shown in FIGS. 6 to 8 on the rear surface thereof. Many kinds of the detachable card casings 3 are prepared, allowing the user to exchange the card casings 3. For example, the card casing 3 having the large-size LCD 42 shown in FIG. 9 is detached from the body casing 2 and the card casing 3 having the touch panel 44 shown in FIG. 11 is attached thereto by inserting the slide pins 41U and 41L into the upper and lower guide grooves 36U and 36L in a one-touch operation.

A left side surface of the card casing 3 thus attached to the body casing 2 is pulled in the forward direction from the state shown in FIG. 12, thereby the card casing 3 being erected as shown in FIG. 13. Thereafter, through operations similar to those described with reference to FIGS. 6 to 8, the card casing 3 can be set in the state where the portable information terminal 15 can be used for making a telephone call.

According to the present invention, since it is unnecessary to open the card casing 3 when the information is transmitted and received and it is also unnecessary to transmit and receive the information with the card casing 3 being hung from the hinge portion or the like, it is possible to obtain the portable information terminal whose card casing is prevented from being broken during the telephone call and which has a small and compact size.

Moreover, according to the second embodiment of the present invention, since the large-size LCD 42 can be provided in the small-size portable information terminal, it is possible for the user to easily see a large amount of data of electronic mail without scrolling many times. According to the third embodiment of the present invention, since the card casing 3 has the touch-sensitive panel 44, it is possible to obtain the portable information terminal 15 which provides a simple and easy operation and a satisfactory operability.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A portable telephone comprising:

a body casing having a groove portion with a plane bottom;

function means for transmitting and receiving information incorporated in said body casing;

a card casing which is reversibly and slidably attached in said plane-bottom groove portion of said body casing; and an operation unit included in said card casing;

wherein said operation unit has a touch-sensitive panel input means for input of information by a user.

* * * * *